(12) United States Patent
Cahill, III

(10) Patent No.: US 6,268,888 B1
(45) Date of Patent: *Jul. 31, 2001

(54) MECHANISM FOR ADAPTIVE SELECTION OF ANTI-GHOSTING FILTERING

(75) Inventor: Benjamin M. Cahill, III, Ringoes, NJ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/672,257

(22) Filed: Jun. 26, 1996

(51) Int. Cl.[7] ............................. H04N 5/21; H04N 5/213; H04N 5/217

(52) U.S. Cl. .......................... 348/614; 348/607; 348/611; 348/648

(58) Field of Search ...................................... 348/614, 607, 348/611, 648, 622; 725/149; 375/346–357; H04N 5/21, 5/213, 5/217

(56) References Cited

U.S. PATENT DOCUMENTS

| Re. 34,810 | | 12/1994 | Lemaine et al. . | |
|---|---|---|---|---|
| 4,502,077 | * | 2/1985 | Moretomi et al. | 348/614 |
| 5,089,892 | | 2/1992 | Koguchi et al. . | |
| 5,311,312 | | 5/1994 | Oh . | |
| 5,491,518 | * | 2/1996 | Kim | 348/614 |
| 5,537,151 | | 7/1996 | Orr et al. . | |
| 5,555,025 | | 9/1996 | McArthur . | |
| 5,654,765 | * | 8/1997 | Kim | 348/614 |

FOREIGN PATENT DOCUMENTS

| 0516216 | * | 12/1992 | (EP) | H04N 5/21 |
|---|---|---|---|---|
| 0552557 | * | 7/1993 | (EP) | H04N 5/21 |
| 0617551 | * | 9/1994 | (EP) | H04N 5/21 |
| 4-227378 | * | 8/1992 | (JP) | H04N 5/21 |
| 8-317254 | * | 11/1996 | (JP) | H04N 5/21 |
| 4027400 | * | 11/1994 | (WO) | H04N 5/21 |

OTHER PUBLICATIONS

*PCT International Search Report* for International Application No. PCT/US97/10360 (Docket No. 42390.P3734), dated Oct. 09, 1997, 1 page.

*PCT International Search Report* for International Application No. PCT/US97/10362 (Docket No. 42390.P3733), dated Oct. 17, 1997, 1 page.

*PCT International Search Report* for International Application No. PCT/US97/10350 (Docket No. 42390.P3735), dated Jan. 27, 1998, 1 page.

Joint EIA/CVCC Recommended Practice for Teletext: North American Basic Teletext Specification (NABTS), EIA Standard: EIA—516, May 1988, pp.: Cover, Preface, i–vi, 1–5, and 62–65.

"Recommended Practice for Line 21 Data Service", EIA Standard: EIA—608, Sep. 1994, pp.: Cover, i–iv, and 7–9.

* cited by examiner

*Primary Examiner*—Andrew Faile
*Assistant Examiner*—Vivek Srivastava
(74) *Attorney, Agent, or Firm*—Blakely, Sokoloff, Taylor & Zafman LLP

(57) ABSTRACT

A mechanism for adaptive selection of anti-ghosting filtering accesses a first plurality of coefficients being used by the anti-ghosting filtering and compares a first set of one or more of the first plurality of coefficients to a first predetermined value. The mechanism then modifies the anti-ghosting filtering based on the results of this comparison. In one embodiment, the mechanism includes both an adaptive baseband equalization filter and a lookup table filter.

21 Claims, 8 Drawing Sheets

MECHANISM FOR ADAPTIVE SELECTION OF ANTI-GHOSTING FILTERING

BACKGROUND OF THE INVENTION

1. Field of the Invention

The present invention pertains to the field of television signal processing. More particularly, this invention relates to selecting the amount of anti-ghosting filtering to be performed.

2. Background

Television transmission signals typically account for a vertical blanking interval (VBI). The VBI refers to the time required by the electron gun in a conventional television set (or similar visual display) to reset itself to the top of the television screen from the bottom of the screen. Conventional television sets and many other visual displays generate their display by using an electron gun(s) to illuminate each line on the television screen. The electron gun illuminates a single line at a time and typically starts at the top of the screen, illuminates every other line as it travels down the screen, then resets itself to the top of the screen once it reaches the bottom. During this reset from the bottom of the screen to the top of the screen, no lines of the screen are being illuminated. This period of reset is referred to as the VBI.

During the VBI, no video information is transmitted by a broadcasting device because the electron gun is not illuminating lines at that time. Thus, control information and/or other data can be transmitted during the VBI rather than video and/or audio information without disrupting the video and/or audio transmission. Typically, a portion of the VBI is used by television broadcasters for control information necessary for displaying the audio and video information. This control information includes, for example, vertical and horizontal video synchronization signals. In addition, a portion of the VBI is typically reserved for broadcasting the text for closed captioning for the hearing impaired. However, unused space remains in the VBI which can be used by a broadcaster to broadcast any of a wide variety of data, typically referred to as teletext data, of the broadcaster's choosing.

One problem inherent in the transmission of television signals is referred to as "ghosting". Ghosting results from an echo(es) of the transmitted signal. Ghosting occurs when there is a reflection of a television signal or similar "bouncing" of the signal off of a particular object in or near the signal's path. Ghosting presents a problem when transferring data over the VBI because the reflected or echoed signal(s) interferes with the data being transmitted.

Several anti-ghosting mechanisms have been developed to reduce the effects of ghosting in a television transmission signal. Two such mechanisms are referred to as Adaptive Baseband Equalization (ABBE) filtering and Lookup Table (LUT) filtering. Both of these anti-ghosting filtering mechanisms look at one or more surrounding samples for a particular sample of data and perform various filtering processes using these bits to reduce the ghosting effects on the signal being transferred.

Using the ABBE and LUT filters reduces the ghosting effects on the signal being transmitted, thereby increasing the quality of the signal. Using these filters, however, requires additional computational time. That is, the system receiving the signals must expend additional computational resources, and therefore time, to perform the filtering; without the filtering, this time could be spent performing other tasks. In situations where the ghosting effects on the signal are not too great, all of the possible filtering which can be done by the ABBE and LUT filters may not be necessary. In these situations, it would be advantageous if computational resources could be freed to perform other more important tasks. Therefore, it would be beneficial to provide a mechanism for automatically selecting how much filtering be done to reduce anti-ghosting effects.

Furthermore, the quality of the signal being transmitted can improve or worsen over time. Therefore, the anti-ghosting filtering procedures selected at is one point in time may become unnecessary, or alternatively insufficient, at a later point in time. Thus, it would be beneficial to provide a mechanism for modifying, in real-time, the selected anti-ghosting filtering to be performed.

As will be described in more detail below, the present invention provides a mechanism for adaptive selection of anti-ghosting filtering to achieve these and other desired results which will be apparent to those skilled in the art from the description that follows.

SUMMARY OF THE INVENTION

A mechanism for adaptive selection of anti-ghosting filtering is described herein. The mechanism accesses a first plurality of coefficients being used by the anti-ghosting filtering and compares a first set of one or more of the first plurality of coefficients to a first predetermined value. The mechanism then modifies the anti-ghosting filtering based on the results of this comparison. In one embodiment, the anti-ghosting filtering includes both an adaptive baseband equalization filter and a lookup table filter.

According to one embodiment of the present invention, different numbers of coefficients can be used by the adaptive baseband equalization filter to achieve different amounts of anti-ghosting filtering. The number of coefficients used by the adaptive baseband equalization filter is decreased if the magnitudes of the coefficients are small enough. Additionally, either or both of the adaptive baseband equalization filter and the lookup table filter can be disabled, based on the magnitudes of the coefficients for the filters. Furthermore, if the error rate for received data becomes too high, then either or both of the adaptive baseband equalization filter and the lookup table filter can be re-enabled, or the number of coefficients used by the adaptive baseband equalization filter can be increased.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is to be appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

According to one embodiment, the present invention adaptively selects the anti-ghosting filtering to be used for received signals. The present invention periodically monitors the coefficients used by the anti-ghosting filters as well as the error rate for received data. If the coefficients of the filters become too small, then the amount of anti-ghosting filtering being performed is reduced. On the other hand, if the error rate becomes too high, then the anti-ghosting filtering being performed is increased.

Figure 1:
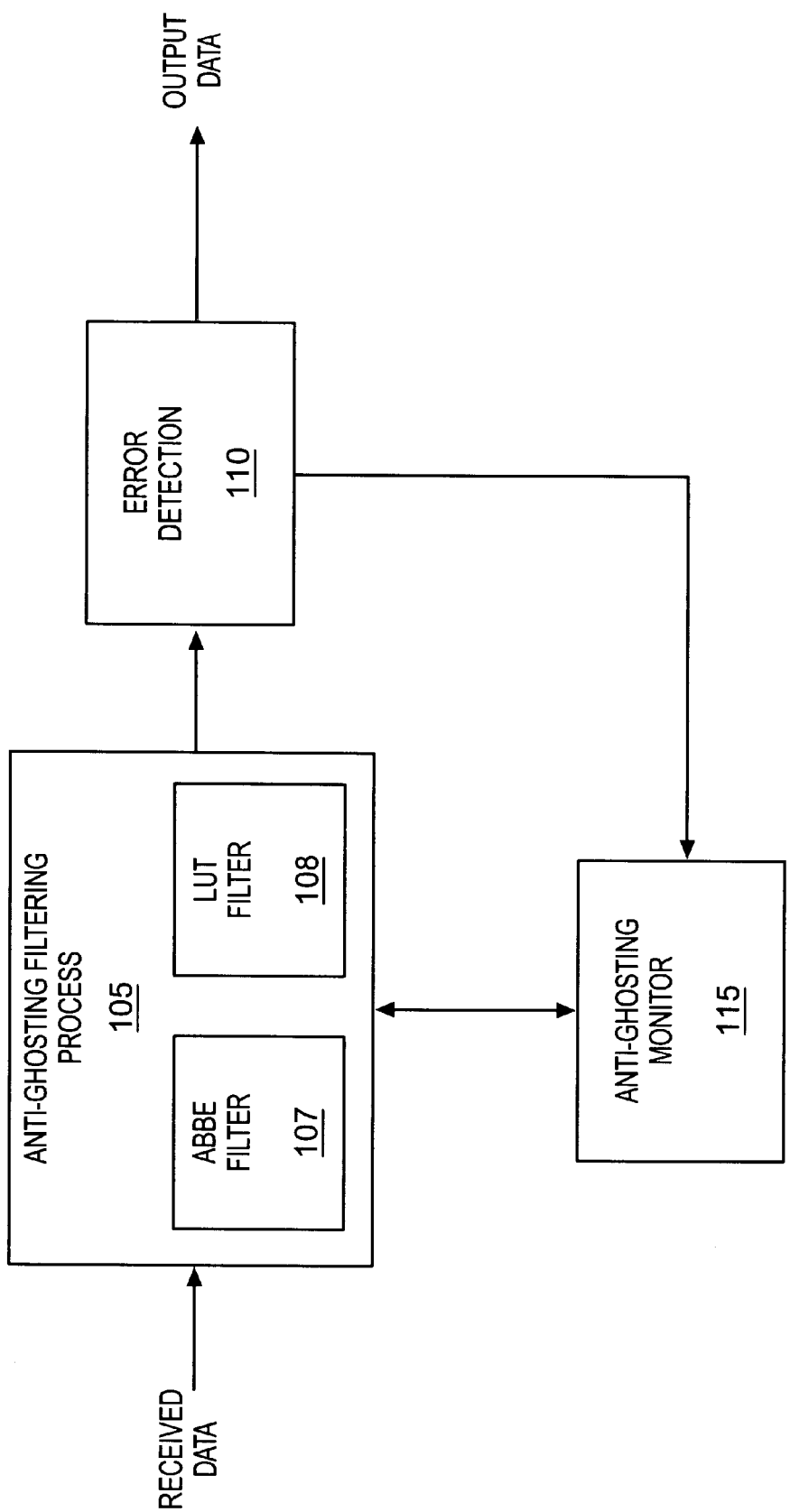
FIG. 1 is a block diagram illustrating an overview of one embodiment of the present invention.

FIG. 1 is a block diagram illustrating an overview of one embodiment of the present invention. FIG. 1 shows an anti-ghosting filtering process 105, an error detection block 110, and an anti-ghosting monitor 115. Data is received during a vertical blanking interval from a North American Broadcast Television Specification (NABTS)[1] signal. The data is filtered through the anti-ghosting filtering process 105, which in the illustrated embodiment includes both an Adaptive Baseband Equalization (ABBE) filter 107 and a Lookup Table (LUT) filter 108 for anti-ghosting filtering. The output of the anti-ghosting filtering process 105 is the anti-ghosted data. The anti-ghosted data is then input to the error detection logic 110. The error detection logic 110 detects errors in the anti-ghosted data, and provides an indication of the errors to the anti-ghosting monitor 115. The anti-ghosting monitor 115 also accesses the coefficients used by the ABBE filter 107 and the LUT filter 108, and updates the filtering process 105 based on these coefficients as well as the errors indicated by the error detection logic 110, as discussed in more detail below.

[1] See Joint EIA/CVCC Recommended Practice for Teletext North American Basic Teletext Specification (NABTS), EIA-516, May 1988.

In one embodiment, the present invention is used in conjunction with a self-correcting anti-ghosting process as disclosed in copending U.S. patent application, Ser. No. 08/670,563, U.S. Pat. No. 5,812,217 entitled, Automatically Adjusting Anti-Ghosting Filter Coefficients when the Coefficients Exceed Particular Values, invented by the inventor of the present invention, and filed contemporaneously with the present application.

In one embodiment of the present invention, the received data is teletext data sampled at periodic intervals. Each sampled portion of the input data stream is represented by an 8-bit value which will be later interpreted as a logical zero or a logical one. This 8-bit value is received by the ABBE filter 107 and/or the LUT filter 108, which apply various filtering mechanisms to the value in order for the decoder to correctly identify whether the digital value of the 8-bit representation of the sampled analog value is a logical zero or a logical one.

Which of the ABBE filter 1076 and the LUT filter 108, if either, is used is discussed in more detail below.

The ABBE filter 107 is an n-tap filter which applies various filtering in accordance with configured filtering coefficients, also referred to as parameters, to the current sampled value being analyzed and the surrounding sampled values. The ABBE filter 107 includes, for each tap, a corresponding coefficient. The number of surrounding sampled values which are used by the filter depends on the value of "n". Each tap in the filter refers to one of the sampled values being used by the filter. For example, in a 5-tap filter, the current sampled value to being analyzed as well as the immediately subsequent two sampled values and the immediately preceding two sampled values are used by the filter.

Figure 2A:
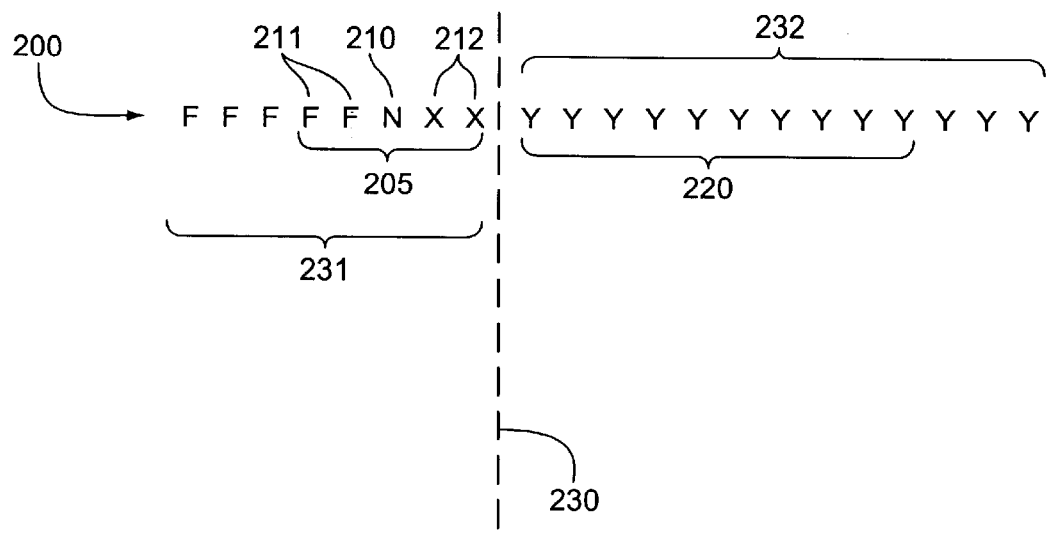
FIG. 2a illustrates an example of a data stream such as may be used with one embodiment of the present invention.

FIG. 2a illustrates an example of a 5-tap filter. In FIG. 2a, an input data stream 200 is shown including previously analyzed values (denoted by an "X" or a "Y" in the stream 200), future values to be analyzed (denoted by an "F" in the stream 200), and the current value being analyzed (denoted by an "N" in the stream 200). A 5-tap filter span 205 is shown, which includes the current value being analyzed 210, the immediately subsequent two values 211, and the immediately preceding two values 212.

A dividing line 230 is also shown in FIG. 2a. The dividing line 230 illustrates the separation between the 8-bit representations of sampled values and single-bit logical values (that is, a logical zero or a logical one). The set of values 231 of the input stream 200, illustrated as "X", "F", and "N", are multiple-bit representations of sampled values, and the set of values 232 of the input stream 200, illustrated as "Y", have already been decoded as single-bit logical values.

A different coefficient is applied to each of the sampled values used by the ABBE filter. In one embodiment, the initial coefficients for a 5-tap filter are: (0 0 16 0 0). However, these coefficients can change over time, as discussed below. The coefficient corresponding to the sampled value currently being analyzed is referred to as the primary coefficient, and the remaining coefficients are referred to as secondary coefficients. Thus, in the example illustrated in FIG. 2a, the current value 210 is multiplied by the coefficient 16 (the primary coefficient), and the preceding values 212 and subsequent values 211 are each multiplied by the coefficient 0 (the secondary coefficients). The five values 210–212, after being multiplied by their coefficients, are summed together and then normalized, thereby providing an ABBE-filtered value representing the sampled data value.

The ABBE coefficients are slowly trained over time. This training is done by periodically comparing the results of the ABBE-filtered value to the ideal expected value and adding a fraction of the difference between the ABBE-filtered value and the ideal value to the coefficient. The ABBE-filtered value is compared to the closest ideal value, the difference is calculated, and the difference is applied to each of the coefficients in a conventional manner. It is to be appreciated that the speed with which the ABBE coefficients are trained can be altered. For example, the coefficients may be updated after every ABBE-filtered value, or alternatively, the coefficients may be updated periodically, such as after every fifteen values are filtered. The training of ABBE coefficients is well-known to those skilled in the art and thus will not be discussed further, except as it pertains to the present invention.

It is to be appreciated that although a 5-tap filter is discussed above, any of a wide range of taps may be used for the ABBE filter. Typically, an odd number of taps is used to provide symmetry about the value being analyzed. However, an even number of taps may also be used. By way of example, an 11-tap filter or 10-tap filter may be used by the present invention. Additionally, a decoder may support a predetermined set of n-tap filters, such as 0-tap, 5-tap and 11-tap filters.

The second anti-ghosting filtering mechanism used by the present invention is the Lookup Table (LUT) filter 108. The LUT filter 108 accounts for data values of previously analyzed bits which are outside the range of the ABBE filter. The LUT filter 108 uses a predetermined number of the preceding data samples as an index into a predetermined table. In one embodiment of the present invention, ten preceding data samples are used as the index, however, it is to be appreciated that different numbers of samples can be used.

FIG. 2a illustrates an example of an LUT index according to one embodiment of the present invention. A 10-bit index 220 from the stream 200 is shown. As illustrated, the LUT index 220 is taken from the range of bits outside the ABBE filter span 205. It is to be appreciated that all of the preceding values (denoted by an "X" or a "Y") have already been analyzed by the anti-ghosting filters, regardless of whether they are used in the filtering of subsequent values as multiple-bit representations of the sampled values or single-bit logical values.

Figure 2B:
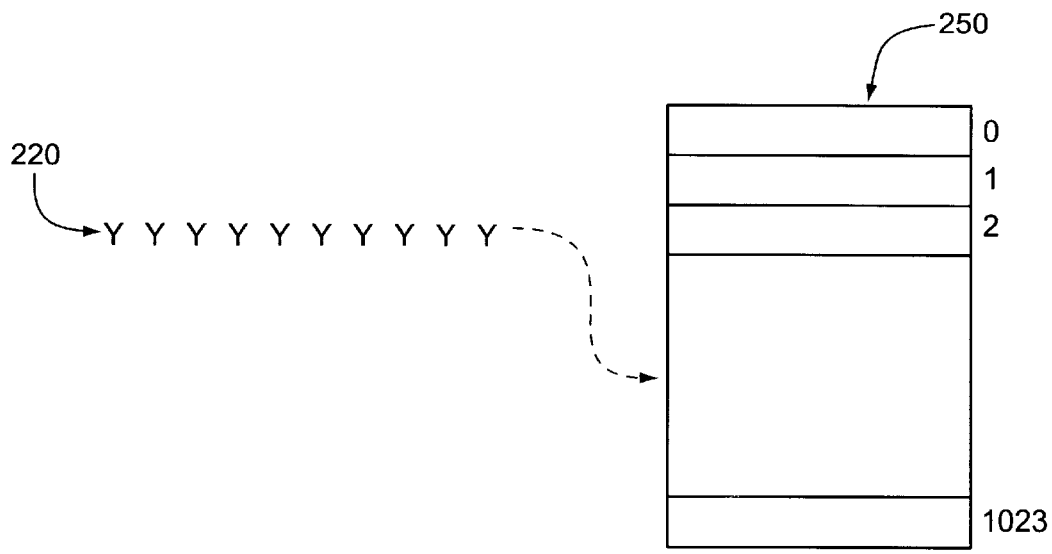
FIG. 2b illustrates a lookup table and index according to one embodiment of the present invention.

The ten bits 220 of the LUT index are concatenated together and used as an index into the lookup table 250 as illustrated in FIG. 2b. Given that the index is a ten-bit value, it is to be appreciated that the lookup table 250 is a 1024-entry table, with each index value indexing into a unique location of the table.

The value derived from the lookup table is then added to the ABBE-filtered value, resulting in an anti-ghosted value. In one implementation, the anti-ghosted value is a 32-bit positive or negative value. The comparison logic compares this anti-ghosted value to a predetermined threshold to determine whether the value represents a logical zero or a logical one. In one implementation, this predetermined threshold is zero. If the anti-ghosted value is greater than or equal to zero, then the value is identified as a logical zero. Correspondingly, if the anti-ghosted value is less than zero, then the value is identified as a logical one.

The LUT coefficients (that is, the values stored in the entries of the lookup table) are also trained and can therefore change over time. Initially, each entry in the lookup table 250 has a value of zero. For training, the difference between the ABBE-filtered value and the closest ideal value, discussed above, is compared to the value derived from the lookup table 250. A predetermined fraction (for example, 1/64) of the difference is then added to the indexed entry of the lookup table 250.

Therefore it can be seen that both the LUT and the ABBE coefficients can change over time. The goal of this changing is to allow the ABBE-filtered and LUT-filtered values to adapt over time to be closer to the ideal values.

In addition to the anti-ghosting filtering process, various error checking processes are also used by the error detection logic 110 of FIG. 1 to detect errors when transferring data during the VBI. In one embodiment of the present invention, four different types of error checking are used: (1) frame code checking, (2) Hamming coding of certain bytes, (3) test patterns, and (4) forward error correction. It is to be appreciated that any combination of these error checking methods may be used, and that any of a wide variety of additional error checking methods may also be used with the present invention.

These error checking processes, shown as error detection block 110 are used by one embodiment of the present invention to determine when the anti-ghosting procedures should be modified. This modification can include, for example, enabling filters 107 and 108 or expanding the number of taps used by the ABBE filter 107. The anti-ghosting monitor 115 monitors the error rates indicated by each of these error checking processes and modifies the anti-ghosting procedures, as discussed in more detail below.

In one embodiment of the present invention, the first byte following the run-in clock is a frame code. The frame code is an 8-bit value indicating whether the scan line contains valid VBI data. In one implementation, the frame code for a valid scan line of VBI data is either $0xE7_{16}$ or $0x2D_{16}$. Since the frame code is a known value, the error detector 110 can detect whether there is an error in the frame code (for example, there is an error in frame code if the frame code is neither $0xE7_{16}$ nor $0x2D_{16}$). In one implementation, the present invention only keeps track of single-bit errors in the frame code.

According to one embodiment of the present invention, the five bytes following the frame code are Hamming coded such that four bits of data are encoded in each byte. Based on the Hamming coding, a two-bit error in the four bits of data can be detected, and a single-bit error in the four bits of data can be both detected and corrected. Hamming coding is well-known to those skilled in the art, and thus will not be discussed further, except as it pertains to the present invention.

In one embodiment of the present invention, a test pattern known to both the transmitting device and the receiving device can be transmitted during the VBI. In one implementation, if the transmitting device does not have any VBI data to be sent for a particular VBI scan line, the transmitting device sends the known test pattern. This test pattern can be identified to the receiving device by using a predetermined frame code and packet address. Upon receipt of the known test pattern, the error detector 110 checks whether there are any errors in the received pattern.

The present invention also makes use of forward error correction. Forward error correction refers to any of a wide variety of additional error detection and correction techniques, such as the use of parity bits. It is to be appreciated that any of a wide variety of conventional forward error correction techniques can be used with the present invention.

Figure 3:
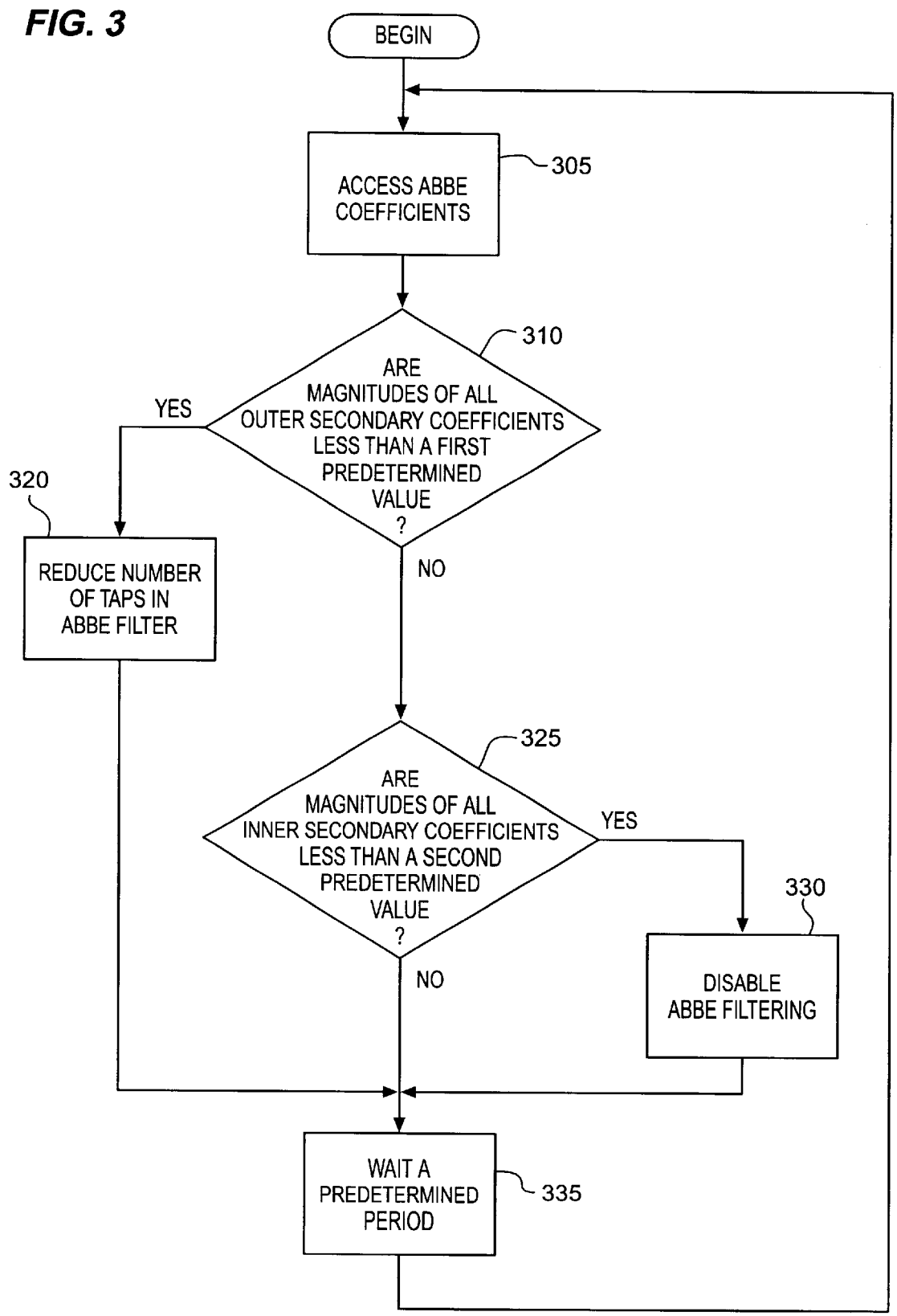
FIG. 3 is a flowchart illustrating the steps followed in reducing the number of taps used by an ABBE filter according to one embodiment of the present invention.

FIG. 3 is a flowchart illustrating the steps followed in reducing the number of taps used by the ABBE filter according to one embodiment of the present invention. The anti-ghosting monitor first accesses the ABBE coefficients, step 305, and checks whether all outer secondary coefficients have a magnitude less than a first predetermined value, step 310. The secondary coefficients are separated into "inner" and "outer" coefficients. In one embodiment using an 11-tap filter, there are three outer secondary coefficients and two inner secondary coefficients on either side of the primary coefficient, and using a 5-tap filter, there is one outer and one inner secondary coefficient on either side of the primary coefficient. For example, if the coefficients of an 11-tap filter are (–4 –3 0 2 5 18 6 3 1 –3 –4), then the outer secondary coefficients are (–4 –3 0 1 –3 –4), and the inner secondary coefficients are (2 5 6 3). However, it is to be appreciated that the secondary coefficients can be divided as inner and outer coefficients in any of a wide range of manners, ranging from zero to all being outer coefficients.

If the outer secondary coefficients each have a magnitude less than a first predetermined value, then the anti-ghosting monitor reduces the number of taps in the ABBE filter, step 320. In one implementation the first predetermined value is two. Typical values for the first predetermined value range from zero to two. However, it is to be appreciated that any of a wide range of values can be used for the first predetermined value, balancing computational efficiency versus sufficient filtering of the received data.

In one embodiment, the decoder uses either a 0-tap, 5-tap, or 11-tap ABBE filter. Thus, if the decoder is currently using an 11-tap filter, then the decoder reduces to a 5-tap filter in step 320. It is to be appreciated that a 0-tap filter is equivalent to no filtering by the ABBE filter. If the decoder is currently using a 0-tap filter, then the decoder continues to use the 0-tap filter in step 320. In one implementation, the coefficients for the excess taps when reducing the filter are simply dropped and ignored. However, these excess coefficients may be saved by the anti-ghosting monitor in case they are needed for subsequent increases in the number of taps, as discussed in more detail below with reference to FIG. 5.

The anti-ghosting monitor then proceeds to wait for a predetermined period, step 335. In one embodiment, this predetermined period is thirty VBI scan lines. Typical values for the predetermined period in step 335 are 15 to 60 scan lines. However, it is to be appreciated that different periods can be used, balancing computational efficiency versus sufficient filtering of the received data. The anti-ghosting monitor waits for the predetermined period to expire before again accessing the ABBE coefficients in step 305. In one implementation, the anti-ghosting monitor waits for thirty VBI scan lines of valid VBI data. Alternatively, the anti-ghosting monitor may wait for thirty VBI scan lines, regardless of whether they contain valid VBI data.

Returning to step 310, if the outer secondary coefficients do not have magnitudes less than the first predetermined value, or if there are no outer secondary coefficients, then the anti-ghosting monitor checks whether the magnitudes of all the inner secondary coefficients are less than a second predetermined value, step 325. In one embodiment, the second predetermined value is one. Typical values for the second predetermined value range from one to three. However, it is to be appreciated that any of a wide variety of values can be used for the second predetermined value, balancing computational efficiency versus sufficient filtering of the received data.

If all the inner secondary coefficients are less than the second predetermined value, then the anti-ghosting monitor turns off or disables ABBE filtering, step 330. In one implementation, this is done by setting the ABBE filtering to use a 0-tap filter. The anti-ghosting monitor then waits for a predetermined period, step 335, before again accessing the ABBE coefficients.

In one embodiment, the steps shown in FIG. 3 are only used if the ABBE filtering is currently turned on (in other words, enabled). Thus, if the ABBE filtering is currently disabled, then the anti-ghosting monitor does not expend computational resources accessing the coefficients and comparing them to various predetermined values.

In the embodiment discussed above, the anti-ghosting monitor does not check the magnitudes of the inner secondary coefficients until waiting a predetermined period of time after reducing the number of taps in the ABBE filter in step 320. In alternate embodiments, the anti-ghosting monitor proceeds to step 325 from step 320, thereby checking the inner secondary coefficients immediately after reducing the number of taps in step 320.

Figure 4:
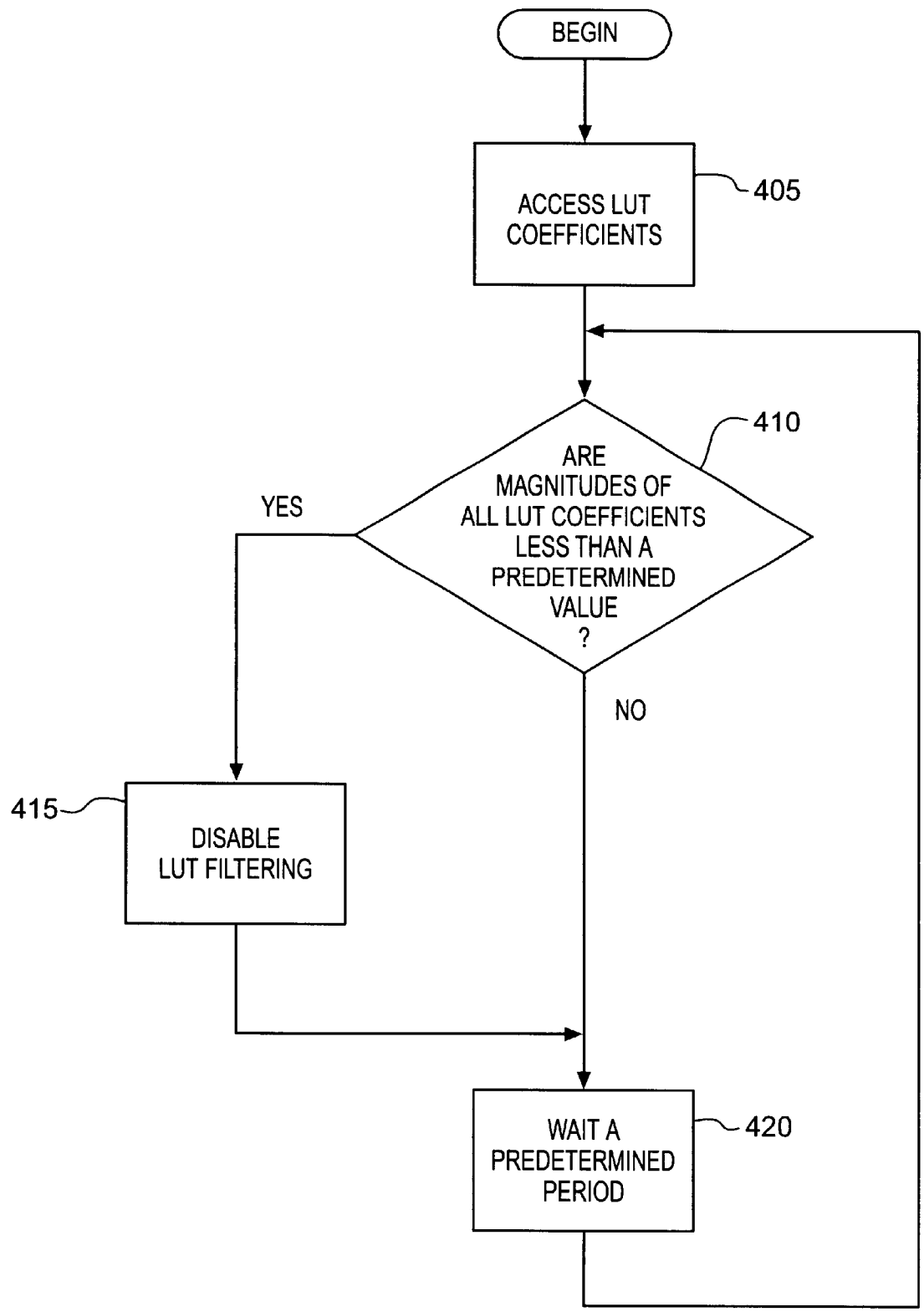
FIG. 4 is a flowchart illustrating the steps followed in disabling filtering by an LUT filter according to one embodiment of the present invention.

FIG. 4 is a flowchart illustrating the steps followed in disabling filtering by the LUT filter according to one embodiment of the present invention. The anti-ghosting monitor first accesses the LUT coefficients, step 405, and checks whether the magnitudes of all the LUT coefficients are less than a predetermined value, step 410. In one implementation, this predetermined value is $10_{16}$. Typical values for this predetermined value range from $2_{16}$ to $18_{16}$; however, it is to be appreciated that any of a wide range of values can be used, balancing computational efficiency versus sufficient filtering of the received data.

If the magnitudes of all the LUT coefficients are less than the predetermined value, then the anti-ghosting monitor disable LUT filtering, step 415. Regardless of whether LUT filtering is disabled in step 415, the present invention proceeds to wait for a predetermined period to expire, step 420, prior to re-accessing the LUT coefficients. In one embodiment, this period in step 420 is the same period as discussed above in step 335 of FIG. 3. However, it is to be appreciated that any of a wide range of periods can be used in step 420.

In one embodiment, the steps shown in FIG. 4 are only used if the LUT filtering is currently enabled. Thus, if the LUT filtering is currently disabled, then the present invention does not expend computational resources accessing the coefficients and comparing them to various predetermined values.

Figure 5:
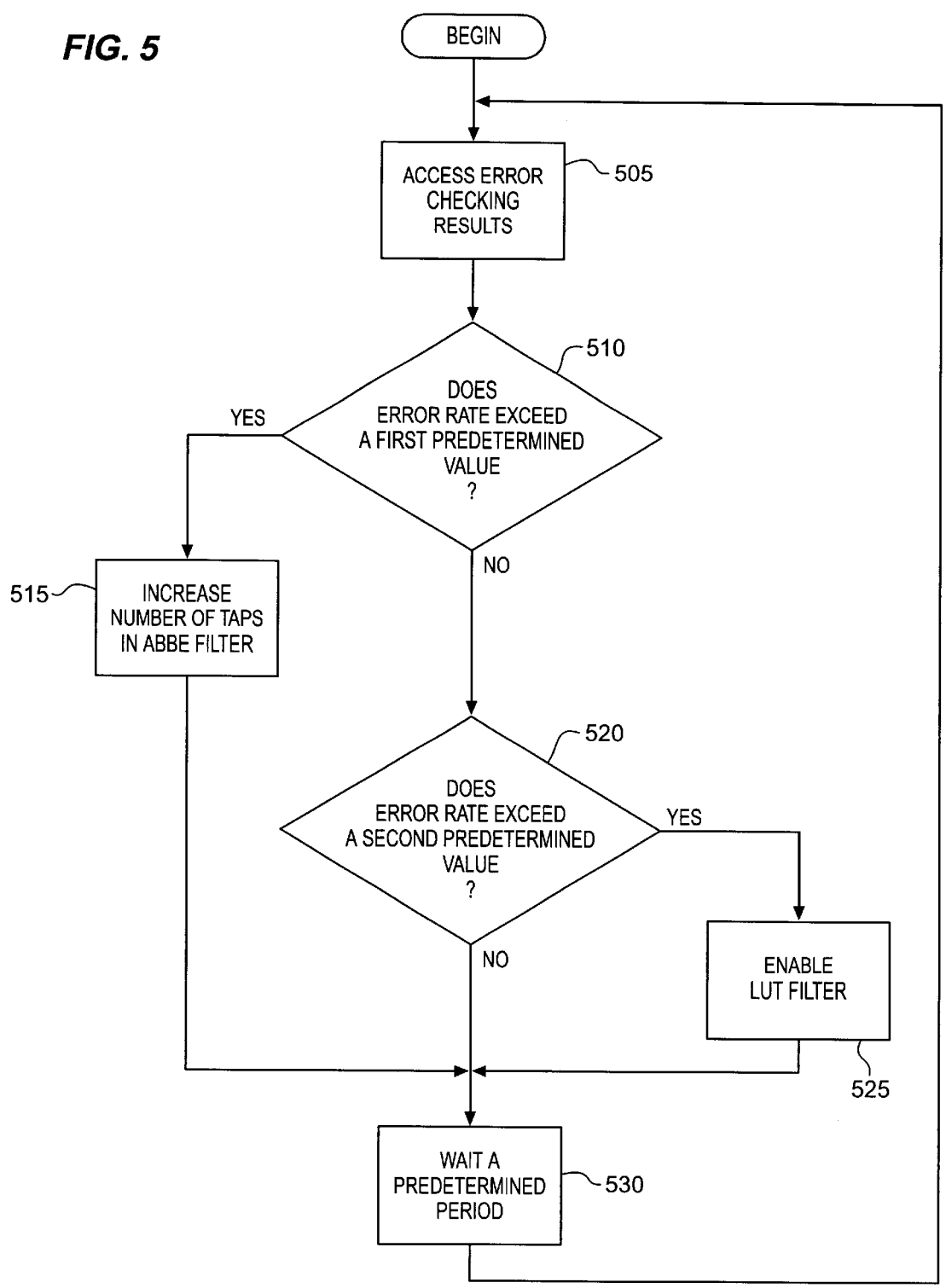
FIG. 5 is a flowchart illustrating the steps followed in enabling a filter and/or increasing the number of taps used by an ABBE filter according to one embodiment of the present invention.

FIG. 5 is a flowchart illustrating the steps followed in enabling a filter and/or increasing the number of taps used by the ABBE filter according to one embodiment of the present invention. The anti-ghosting monitor first accesses the error checking results, step 505. The error checking results are the indications of errors detected by any of the error checking methods discussed above (for example, the Hamming coded bytes, forward error correction, etc.). The anti-ghosting monitor maintains a record of the errors and checks the number of errors that have occurred since the last time the error checking results were accessed, so that an error frequency or error rate can be readily determined. The anti-ghosting monitor checks whether the error rate exceeds a first predetermined value, step 510. In one implementation, this first predetermined value is one. Typical values for the first predetermined value range from zero to five. However, it is to be appreciated that any value can be used for the first predetermined value, balancing computational efficiency versus sufficient filtering of the received data.

If the error rate exceeds this first predetermined value, then the anti-ghosting monitor increases the number of taps used in the ABBE filter, step 515. In one implementation, this increase in the number of taps is done in steps, based on which numbers of taps the decoder supports. For example, if the ABBE filter supports 0-tap, 5-tap, and 11-tap filters, and if the ABBE filter is currently turned off, then it increases to use a 5-tap filter, and if the ABBE filter is currently using a 5-tap filter, then it increases to use an 11-tap filter. In an alternate implementation, the increase in number of taps is an immediate jump to the highest number of taps supported by the decoder. For example, if the decoder supports 0-tap, 5-tap, and 11-tap ABBE filters, then if the ABBE filter is currently turned off (0-tap filter), then it immediately increases to an 11-tap filter in step 515. In one embodiment, the coefficients for the additional taps in step 515 are each zero. In alternate embodiments, the coefficients for the additional taps in step 515 are increased to the values they had, if any, prior to the last time the number of taps in the ABBE filter was reduced.

The anti-ghosting monitor then proceeds to wait for a predetermined period to expire, step 530. In one embodiment, this period in step 530 is the same period as discussed above in step 335 of FIG. 3. However, it is to be appreciated that any of a wide range of periods can be used in step 530.

Returning to step 510, if the error rate does not exceed the first predetermined value, then the anti-ghosting monitor checks whether the error rate exceeds a second predetermined value, step 520. In one implementation, this second predetermined value is one. Typical values for the second predetermined value range from zero to five. However, it is to be appreciated that any value can be used for the second predetermined value, balancing computational efficiency versus sufficient filtering of the received data.

If the error rate exceeds the second predetermined value in step 520, then the anti-ghosting monitor turns the LUT filter on, step 525. In one embodiment, the LUT table is re-initialized for all entries to be zero. Alternatively, the LUT table may maintain the same entries it had prior to being turned off. Regardless of whether the LUT filter is turned on in step 525, the anti-ghosting monitor proceeds to wait for a predetermined period in step 530. The anti-ghosting monitor then repeats the above process.

In one embodiment, the steps shown in FIG. 5 are only used if the LUT filtering is currently disabled and the ABBE filter is operating at less than its maximum number of taps (for example, if the ABBE is using a 0-tap or 5-tap filter in embodiments where the decoder supports 0-tap, 5-tap, and 11-tap filters). Thus, if the LUT filtering is currently enabled, and the ABBE filter is operating at its maximum number of taps, then the anti-ghosting monitor does not expend computational resources accessing the error rates and comparing them to various predetermined values.

In the embodiment discussed above, the anti-ghosting monitor does not check whether the error rate exceeds the second predetermined value until waiting a predetermined period of time after increasing the number of taps in the ABBE filter in step 515. In alternate embodiments, the anti-ghosting monitor proceeds to step 520 from step 515, thereby checking the error rate against the second predetermined value immediately after increasing the number of taps in step 515.

In another alternate embodiment of the present invention, the LUT filtering is not turned on in step 525 unless the ABBE filter is using its maximum number of taps. For example, if the decoder supports 0-tap, 5-tap, and 11-tap filters, then LUT filtering is not turned on in step 525 unless the ABBE filter is currently an 11-tap filter.

Figure 6:
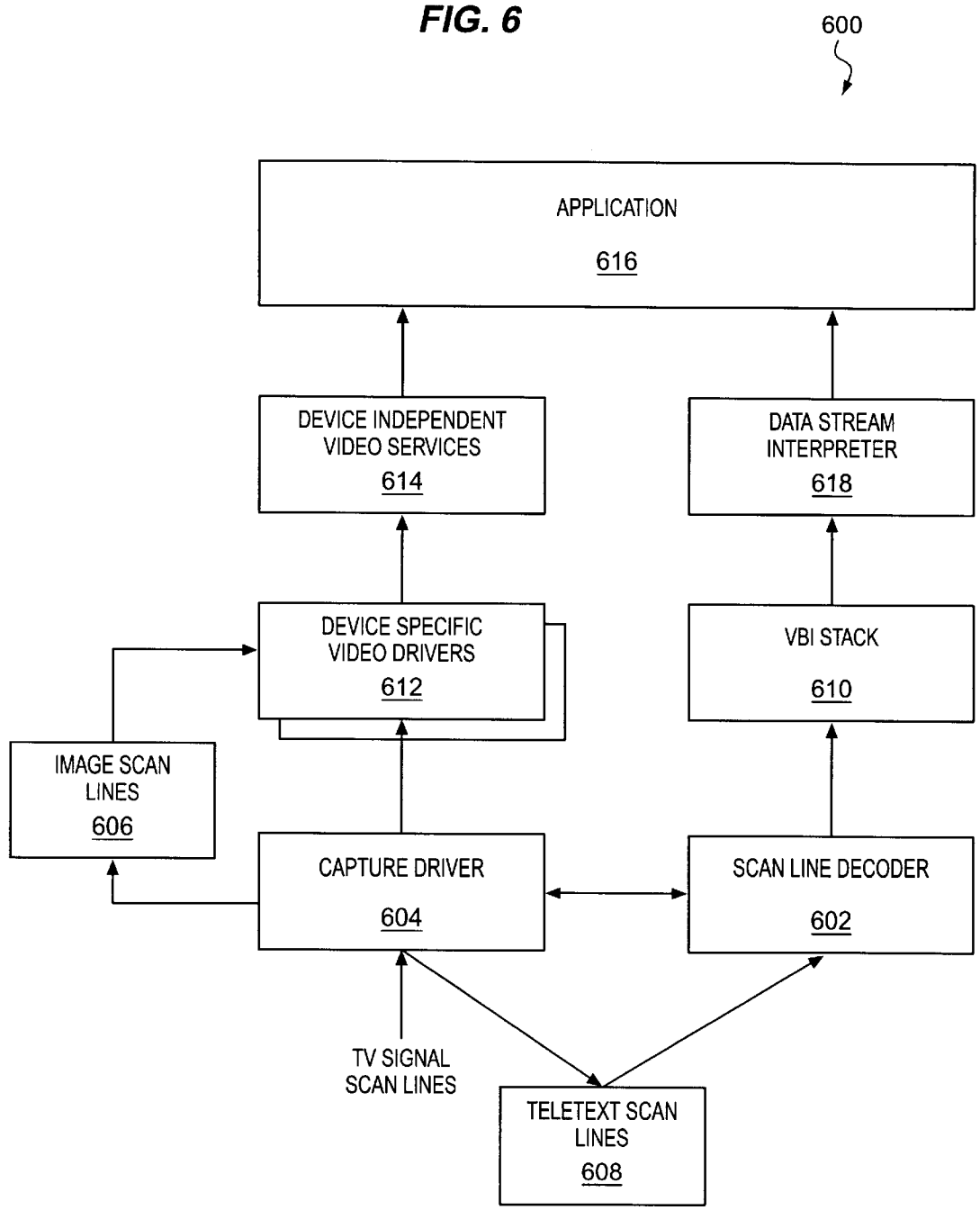
FIG. 6 illustrates one embodiment of a software environment suitable for practicing the present invention.

FIG. 6 illustrates one embodiment of a software environment suitable for practicing the present invention. As illustrated, software embodiment 600 includes common VBI scan line decoder 602 (hereinafter simply common decoder) and capture driver 604, cooperating with each other to generate image scan lines 606 and VBI scan lines 608. VBI scan lines 608 are decoded by decoder 602 into VBI stack 610. Decoded scan lines 608 are in turn interpreted by data stream interpreter 618. Common decoder 602 includes the anti-ghosting filtering of the present invention. Common decoder 602 and capture driver 604 are disclosed in copending U.S. patent application, Ser. No. 08/670,568, entitled, Method And Apparatus For Common Vertical Blanking Interval Scan Line Decoding, invented by the inventor of the present invention, and filed contemporaneously with the present application.

Additionally, image scan lines 606 are processed by device dependent video drivers 612, for example VfW drivers that implement Microsoft Direct™ video support, which in turn provides the processed data to a device independent video service 614, such as Microsoft Video for Windows. The device independent video service 614 then generates the television images for video application 616. With respect to the decoded VBI data (including closed captions), data stream interpreter 618 interprets the decoded VBI data for display to the user via application 616 or other purposes within application 616.

Figure 7:
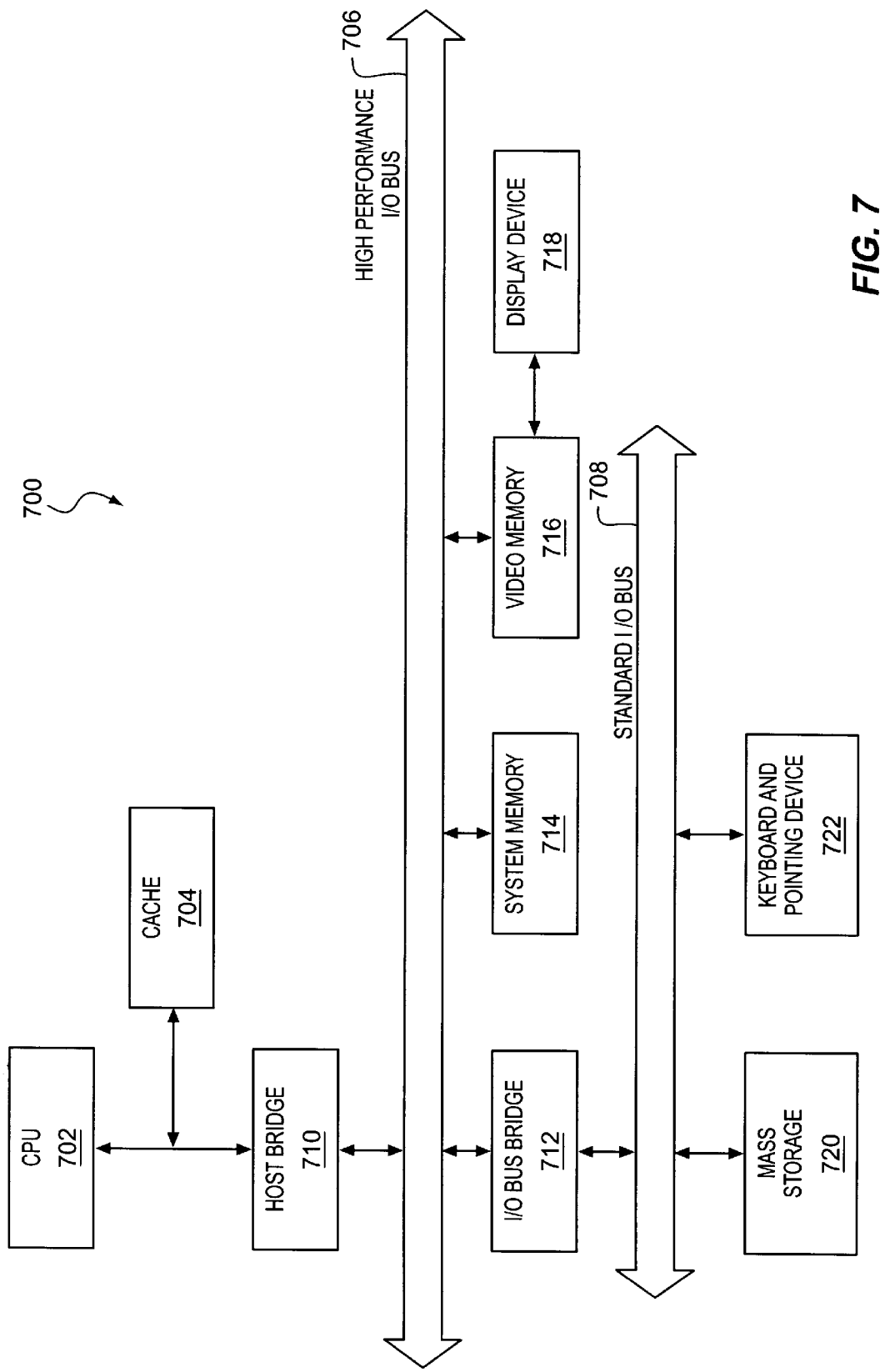
FIG. 7 illustrates one embodiment of a hardware system suitable for programming with the software elements of FIG. 6.

FIG. 7 illustrates one embodiment of a hardware system suitable for programming with the software elements of FIG. 6. As shown, for the illustrated embodiment, hardware system 700 includes CPU 702 and cache memory 704 coupled to each other as illustrated. Additionally, hardware system 700 includes high performance I/O bus 706 and standard I/O bus 708. Host bridge 710 couples CPU 702 to high performance I/O bus 706, whereas I/O bus bridge 712 couples the two buses 706 and 708 to each other. Coupled to bus 706 are system memory 714 and video memory 716. In turn, display device 718 is coupled to video memory 716. Coupled to bus 708 is mass storage 720 and keyboard and pointing device 722.

These elements 702–722 perform their conventional functions known in the art. In particular, mass storage 720 is used to provide permanent storage for the programming instructions implementing the above described functions, whereas system memory 714 is used to provide temporary storage for the programming instructions when executed by CPU 702. Mass storage 720 may be provided with the programming instructions by loading the programming instructions from a distribution storage medium (not shown), or by downloading the programming instructions from a server (not shown) coupled to hardware system 700 via a network/communication interface (not shown). Collectively, these elements are intended to represent a broad category of hardware systems, including, but not limited to, general purpose computer systems based on the Pentium™ processor, manufactured by Intel Corp. of Santa Clara, Calif., assignee of the present invention.

Figure 8:
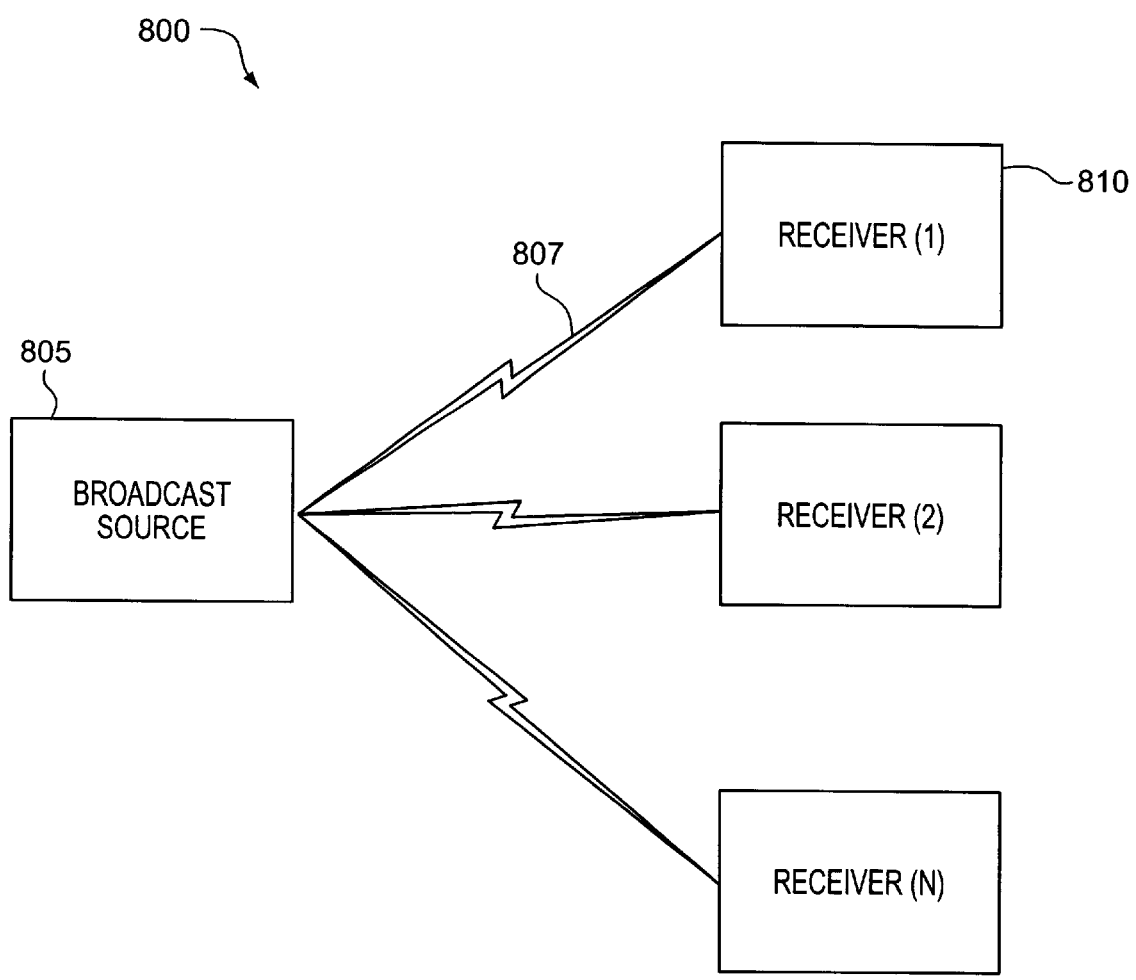
FIG. 8 shows an overview of a signal transmitting and receiving system such as may be used with one embodiment of the present invention.

FIG. 8 shows an overview of a signal transmitting and receiving system 800 such as may be used with one embodiment of the present invention. Transmission signals originate at transmission source 805. Transmission source 805 may be any of a wide variety of conventional signal broadcasting devices, such as a satellite dish, a television transmitter, etc. Transmission source 805 transmits a signal over a transmission medium 807 to multiple (N) receivers 810. Transmission medium 807 represents any of a wide variety of conventional signal transmission media. For example, transmission medium 807 may be a cable, a fiber-optic cable, or a wireless medium transmitting electromagnetic signals in the electromagnetic spectrum. Transmission medium 807 may also include any number of conventional routing or repeating devices, such as satellites or electromagnetic signal repeaters.

Receiver 810 receives the signal transmitted by broadcast source 805. Receiver 810 may be any of a wide variety of conventional signal receiving devices. Receiver 810 may be included as part of a video cassette recorder (VCR), a television set, a computer system, etc. In one implementation, one or more receivers 810 are a hardware system 700 as shown in FIG. 7. The receipt of signals via a transmission medium is well-known to those skilled in the art and thus will not be discussed further.

In the discussions above, the NABTS signal under the National Television Standards Committee (NTSC) is discussed. However, it is to be appreciated that the present invention can be used with any television signal which includes a vertical blanking information. For example, the present invention could be used with the Phase Alternate Line (PAL) broadcast standard utilized in many European countries, or the Sequential Color with Memory (SECAM) broadcast standard used in other European countries.

It is also to be appreciated that although television transmission signals are discussed above, the present invention is equally applicable to other types of transmitted signals.

It is also to be appreciated that although ABBE and LUT filtering are discussed above, other types of anti-ghosting filtering can also be used within the spirit and scope of the present invention.

Thus, the present invention advantageously modifies the anti-ghosting filtering based on how much affect the filtering has on the received signal. If the filtering is providing little improvement to the signal, then the amount of filtering being performed is reduced, thereby reducing the computational time used by the procedures. However, if error rates are too high, then the amount of filtering being performed is increased, thereby increasing the filtering of the received signals.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a mechanism for real-time selection of anti-ghosting filtering has been described.

What is claimed is:

1. A method comprising:

monitoring a first magnitude of at least one selected coefficient of a first number of coefficients, each of said first number of coefficients corresponding to one of a number of taps used by an anti-ghosting filter, values of said first number of coefficients being generated in real time; and reducing the number of taps used by the anti-ghosting filter to reduce the first number of coefficients for which values are being generated in real time if the first magnitude of the at least one selected coefficient of the first number of coefficients drops below a first predetermined value.

2. The method of claim 1, wherein monitoring the first magnitude comprises repeatedly:

accessing the first number of coefficients; and waiting for a predetermined period.

3. The method of claim 1, wherein the anti-ghosting filter comprises an adaptive baseband equalization filter.

4. The method of claim 1, further comprising:

disabling the anti-ghosting filter if the first magnitude of the at least one selected coefficient drops below a second predetermined value.

5. The method of claim 1, wherein the anti-ghosting filter comprises a lookup table filter, and the method further comprises:

monitoring a second magnitude of at least one selected coefficient of a second number of coefficients comprising a lookup table, values of said second number of coefficients being generated in real time; and disabling the lookup table filter if the second magnitude of the at least one selected coefficient of the second number of coefficients drops below a second predetermined value.

6. The method of claim 1, further comprising:

monitoring an error checking result; and increasing the number of taps if the error checking result exceeds a second predetermined value.

7. The method of claim 6, further comprising:

enabling a lookup table filter if the error checking result exceeds a third predetermined value.

8. The method of claim 1, wherein the values of the first number of coefficients are generated based on data received from a transmission source via a vertical blanking interval.

9. The method of claim 6, wherein monitoring the error checking result comprises repeatedly:

accessing the error checking result; and waiting for a predetermined period.

10. A machine readable storage medium having stored thereon instructions to be executed by a processor, the execution of said instructions to implement a method comprising:

monitoring a first magnitude of at least one selected coefficient of a first number of coefficients, each of said first number of coefficients corresponding to one of a number of taps used by an anti-ghosting filter, values of said first number of coefficients being generated in real time; and reducing the number of taps used by the anti-ghosting filter to reduce the first number of coefficients for which values are being generated in real time if the first magnitude of the at least one selected coefficient of the first number of coefficients drops below a first predetermined value.

11. The machine readable storage medium of claim 10, wherein monitoring the first magnitude comprises repeatedly:

accessing the first number of coefficients; and waiting for a predetermined period.

12. The machine readable storage medium of claim 10, wherein the anti-ghosting filter comprises an adaptive baseband equalization filter.

13. The machine readable storage medium of claim 10, wherein the method further comprises:

disabling the anti-ghosting filter if the first magnitude of the at least one selected coefficient drops below a second predetermined value.

14. The machine readable storage medium of claim 10, wherein the anti-ghosting filter comprises a lookup table filter and the method further comprises:

monitoring a second magnitude of at least one selected coefficient of a second number of coefficients comprising a lookup table, values of said second number of coefficients being generated in real time; and disabling the lookup table filter if the second magnitude of the at least one selected coefficient of the second number of coefficients drops below a second predetermined value.

15. The machine readable storage medium of claim 10, wherein the method further comprises:

monitoring an error checking result; and increasing the number of taps if the error checking result exceeds a second predetermined value.

16. The machine readable storage medium of claim 15, wherein the method further comprises:

enabling a lookup table filter if the error checking result exceeds a third predetermined value.

17. The machine readable storage medium of claim 10, wherein the first number of coefficients are generated based on data received from a transmission source via a vertical blanking interval.

18. The machine readable storage medium of claim 15, wherein monitoring the error checking result comprises repeatedly:

accessing the error checking result; and waiting for a predetermined period.

19. An apparatus comprising:

an anti-ghosting monitor to monitor a magnitude of at least one selected coefficient of a number of coefficients, each of said number of coefficients to correspond to one of a number of taps used by an anti-ghosting filter, values of said number of coefficients to be generated in real time, said anti-ghosting monitor to reduce the number of taps used by the anti-ghosting filter to reduce the number of coefficients for which values are to be generated in real time if the magnitude of the at least one selected coefficient of the number of coefficients drops below a first predetermined value.

20. The apparatus of claim 19, wherein to monitor the magnitude of the number of coefficients the anti-ghosting monitor is to repeatedly access the number of coefficients and wait for a predetermined period of time.

21. The apparatus of claim 19, wherein the anti-ghosting monitor is further to disable the anti-ghosting filter if the magnitude of the at least one selected coefficient drops below a second predetermined value.

* * * * *

UNITED STATES PATENT AND TRADEMARK OFFICE
CERTIFICATE OF CORRECTION

PATENT NO.     : 6,268,888 B1
DATED          : July 31, 2001
INVENTOR(S)    : Cahill, III It is certified that error appears in the above-identified patent and that said Letters Patent is hereby corrected as shown below:

Column 4,
Line 43, after "value", delete "to".

Signed and Sealed this

Twenty-fifth Day of February, 2003

JAMES E. ROGAN
*Director of the United States Patent and Trademark Office*